C. PATT.
LOCK.
APPLICATION FILED MAY 17, 1911.
1,042,031.
Patented Oct. 22, 1912.
2 SHEETS—SHEET 1.
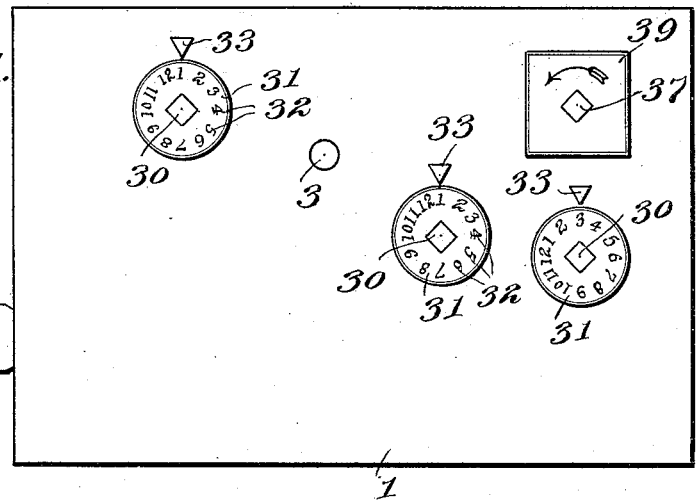
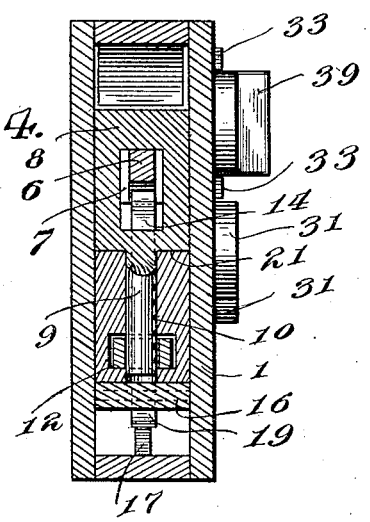
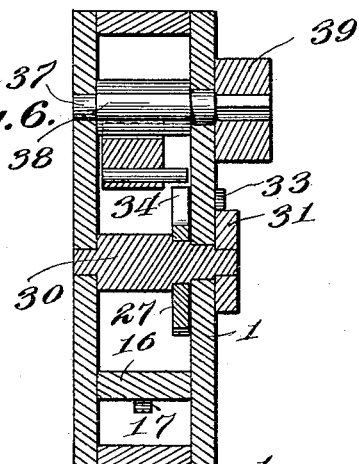
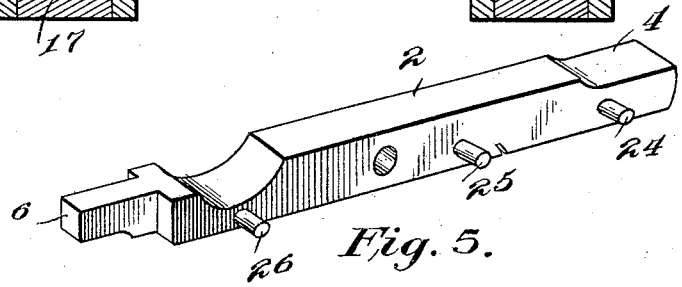
Inventor
Charles Patt
Witnesses
H. H. Lybrand
James D. ...
By Victor J. Evans
Attorney

C. PATT.
LOCK.
APPLICATION FILED MAY 17, 1911.

1,042,031.

Patented Oct. 22, 1912.

2 SHEETS—SHEET 2.

Witnesses
A. H. Lybrand
James D...

Inventor
Charles Patt

By Victor J. Evans
Attorney

UNITED STATES PATENT OFFICE.

CHARLES PATT, OF CENTRALIA, ILLINOIS, ASSIGNOR OF ONE-HALF TO CHARLEY BREAKEFIELD, OF CENTRALIA, ILLINOIS.

LOCK.

1,042,031.  Specification of Letters Patent.  Patented Oct. 22, 1912.

Application filed May 17, 1911. Serial No. 627,700.

*To all whom it may concern:*

Be it known that I, CHARLES PATT, a citizen of the United States, residing at Centralia, in the county of Marion and State of Illinois, have invented new and useful Improvements in Locks, of which the following is a specification.

This invention relates to locks and particularly to one of the combination character wherein means are employed for preventing the retaining member or dog of the mechanism against movement excepting by one having knowledge of the required combination to actuate the lock mechanism.

Figure 2:
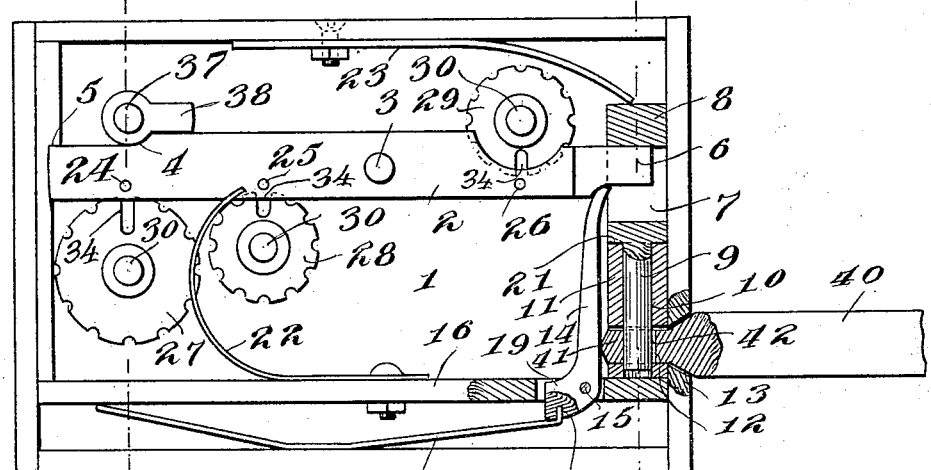
Figure 3:
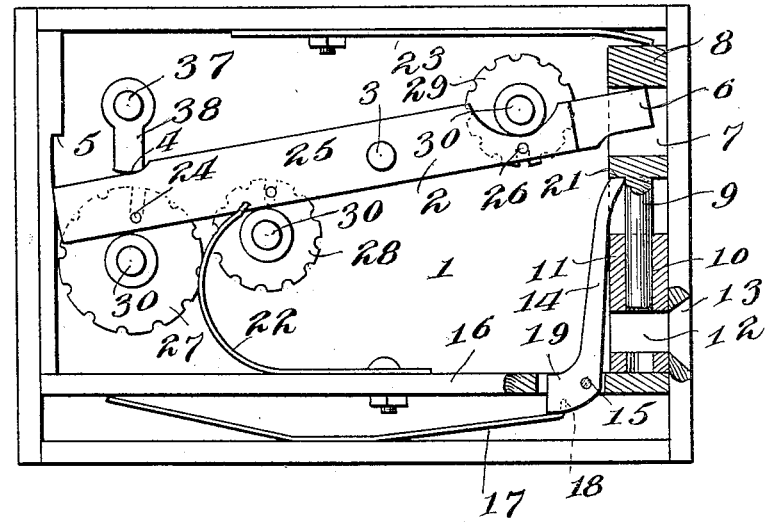

In the drawings, forming a portion of this specification and in which like numerals of reference indicate similar parts in the several views:—Figure 1 is a front view of the lock. Fig. 2 is a rear view thereof with the back plate of the casing removed, the dog being shown in a locked position. Fig. 3 is a similar view showing the dog in a released position. Fig. 4 is a vertical section through a portion of the dog and through the actuating mechanism. Fig. 5 is a perspective view of the actuating member. Fig. 6 is a section on line 7—7 of Fig. 2.

My improved combination lock is designed particularly for use upon sliding doors, and as illustrated, it comprises a casing 1 in which an actuating member 2 is mounted for rocking movement, the said member being mounted on a suitable horizontally disposed supporting bolt 3. This member is provided with a reduced portion 4 at one end which normally bears against the stop shoulder 5 at one end of the casing, being held by the shoulder against movement in one direction past a predetermined point. The opposite end of this member is provided with a reduced finger 6 which extends into the vertical elongated slot 7 in the sliding dog 8.

The dog 8 carries a stem or finger 9 which is slidable in the passage 10 in the dog guide 11. The dog guide 11 is provided with a slot 12 which opens into the passage 10, and as illustrated, the slot 12 at one side opens into a slot 13, and at the opposite side the slot 12 opens directly into the casing and onto the dog locking member 14. The member 14 is pivoted, at 15, to the bar 16 of the casing. The bar 16 is spaced from the bottom wall of the casing and arranged in the intervening space between the bottom wall of the casing and the bar 16 is a leaf spring 17, one end of which being extended into a groove 18 in the nose 19 of the said dog locking member, so that the spring will exert its tension against the member to hold it engaged against the shoulder 21 of the dog 8. The actuating member 2 has its portion 4 normally engaged against the shoulder 5 through the influence of the spring 22, the said spring having one of its ends secured to the bar 16 and having its opposite free end engaged with the actuating member at one side of the pivot support 3.

A spring 23 at the top of the casing engages the dog member 8 so as to force the same to its locked position when the dog locking member 14 is released from engagement with the dog. The locking mechanism for holding the actuating member 2 against movement embodies the pins 24, 25 and 26 which coöperate with the disks 27, 28 and 29, each of which being fixedly secured to a revolubly mounted controlling stem 30.

Each stem is provided at its outer end with a knob 31 which is provided with distinguishing numbers 32 for coöperation with a fixed pointer 33 on the front wall of the casing. Each of said disks is provided with a slot 34 which may be brought into alinement with one of the coöperating pins of the actuating member 2 on the proper manipulation of the knobs 31 to cause the required designating or distinguishing numbers or marks thereon to register with the fixed points 33. The disks 27 and 28 are located below the actuating member 2 and at one side of the support 3. The disk 30 is disposed above and at the opposite side of the actuating member. In view thereof the member will be positively held against rocking movement unless the hereinbefore described slots of the disks are properly adjusted to lie in the path of travel of the pins of the actuating member. A controlling stem 37 is revolubly mounted in the casing, being provided with an interiorly located device having an actuating surface 38 which may be brought to bear against the member 2 so as to move the same against the tension of the spring 22. The outer end of the stem is provided with a suitable manipulating knob 39. The bolt 40 is provided with a reduced portion 41 which is adapted to be extended through the slots 12 and 13, and as shown, the reduced portion 41 is provided with a slot 42 which is adapted to be disposed beneath the stem 9 of the dog 8 so as to be engaged thereby on movement of the dog to its locked position. When the reduced end of the bolt is extended through the dog guide 11 it contacts with the dog locking member 14 so as to move the same to a released position. This permits the dog 8 to be moved under the tension of the spring 23. After the bolt has been engaged with the keeper as described, the disks 36 are rotated so as to move the pin-receiving slots therein out of alinement with the pins on the actuating member.

I claim:

1. A lock comprising a casing having a bolt receiving slot therein, an apertured bolt adapted to slide through the slot in the casing, a dog movable across the slot, a spring bearing against the dog and adapted to move the same in one direction, a movable member located in the casing and adapted to engage the dog to hold the same against the tension of the spring, the said member being adapted to be released from the dog on insertion of the bolt in the casing, an actuating member mounted in the casing and engaged with the dog, the said dog being adapted to engage in the aperture in the bolt when the dog is in one position, a movable device having an actuating surface for moving the actuating member in one direction, a spring for moving the actuating member in an opposite direction, and means for locking the actuating member against movement in either direction.

2. A lock comprising a sliding dog, a spring bearing against the same, bolt actuated means for engaging the dog to hold the same against the tension of the spring, a rocking actuating member for moving the dog against the tension of the spring, and means at the opposite sides of the actuating member for locking the member against movement.

3. A lock comprising a casing having a bolt-receiving slot therein, a movable dog retainer disposed in the path of travel of the bolt, a dog slidable across the slot and adapted to be engaged by the dog retainer whereby the dog is held in unlocking position, a spring for moving the dog when the retainer is disengaged therefrom, the said retainer being disposed in line with the bolt receiving slot of the casing so as to be engaged by the bolt and released thereby from the dog on operative insertion of the bolt in the casing.

4. A lock comprising a casing having a bolt slot therein, a dog movable across the slot, a spring bearing against the dog, means at one side of the slot for holding the dog against the tension of the spring, an actuating member movably connected with the dog and adapted to move the same against the tension of the spring, rotatable members, and means on the actuating member and on the said rotatable members adapted to coöperate to permit movement of the actuating member or to hold the member against movement.

In testimony whereof I affix my signature in presence of two witnesses.

CHARLES PATT.

Witnesses:
T. B. ANDREWS,
S. B. WARREN.